United States Patent [19]

Cavender, Jr.

[11] 4,003,833

[45] Jan. 18, 1977

[54] DETOXIFICATION OF AQUEOUS WASTE STREAMS CONTAINING CYANIDE

[75] Inventor: James V. Cavender, Jr., Texas City, Tex.

[73] Assignee: Monsanto Company, St. Louis, Mo.

[22] Filed: May 24, 1976

[21] Appl. No.: 689,695

[52] U.S. Cl. .......................... 210/59; 210/DIG. 31
[51] Int. Cl.$^2$ ........................................ C02C 5/02
[58] Field of Search ...... 210/50, 59, 63 R, DIG. 31

[56] References Cited

UNITED STATES PATENTS

| | | | |
|---|---|---|---|
| 3,505,217 | 4/1970 | Morico | 210/59 |
| 3,729,413 | 4/1973 | Csuros et al. | 210/59 |
| 3,900,555 | 8/1975 | Jourdan-Laforte | 210/63 R |

FOREIGN PATENTS OR APPLICATIONS

| | | | |
|---|---|---|---|
| 86,153 | 11/1971 | Germany | 210/DIG. 31 |
| 2,407,835 | 8/1975 | Germany | 210/DIG. 31 |

*Primary Examiner*—Thomas G. Wyse
*Attorney, Agent, or Firm*—Elizabeth F. Sporar

[57] ABSTRACT

A method is provided for treating aqueous streams containing minor amounts of cyanide i.e., up to about 1000 ppm, to reduce cyanide content to less than 1 ppm by contacting said stream with formaldehyde and a compound capable of generating the $HSO_3^-$ ion at specified conditions of pH, temperature and reactant-cyanide ratios.

10 Claims, No Drawings

DETOXIFICATION OF AQUEOUS WASTE STREAMS CONTAINING CYANIDE

BACKGROUND OF THE INVENTION

The present invention relates to treatment of aqueous waste streams containing minor amounts of cyanide so as to detoxify such streams. More particularly, it relates to reducing the total cyanide content of aqueous waste streams containing amounts of the order of up to 1000 parts by weight of cyanide per million parts by weight of aqueous waste (1000 ppm) to less than one ppm of cyanide.

There are many industrial sources of aqueous cyanide wastes such as electroplating, steel and coke operations and the manufacture of chemicals. Hydrogen cyanide (HCN) is produced, for example, as a by-product in the production of acrylonitrile by the catalytic reaction of propylene, oxygen and ammonia and minor amounts of this compound occur in some of the non-process aqueous effluent streams in an acrylonitrile plant such as paving run-off water and contaminated condensate, for example. Because of the high toxicity of this contaminant, such streams can only be disposed of if they meet stringent specifications for cyanide content. Generally, they must contain <1 ppm cyanide. Accordingly, some treatment to reduce cyanide content to this level is mandatory.

It is known to treat fluids for the removal of cyanide by contacting them with formaldehyde under basic conditions. Such a process is described in U.S. Pat. No. 2,859,090 for removing a major portion of HCN and only a minor portion of $H_2S$ from catalytically cracked fluids containing HCN, $H_2S$, $NH_3$ and moisture. Also, treatment of aqueous wastes for removal of cyanide with formaldehyde in which formaldehyde cyanohydrin is condensed to a nontoxic polymeric material is described in the article by Shen and Nordquist entitled "Cyanide Removal From Aqueous Waste by Polymerization," Ind. Eng. Chem., Prod. Res. Develop., Vol. 13, No. 1, pp 70–75 (1974). However, when methods such as these are applied to streams containing minor amounts of cyanide, the rate of reaction which initially is quite rapid slows down appreciably as the cyanide level decreases, the reaction rate curve essentially leveling off at various concentrations depending upon the molar ratio of the reactants. The amount of time required for reduction to the specified level of <1 ppm at economic levels of treating agents, therefore, can become impracticably lengthy. It has now been discovered that the reaction can be conducted so that the rate of reaction at the low levels of cyanide concentration can be significantly accelerated and detoxification with formaldehyde can be effected in a commercially feasible reaction time. This is accomplished by employing in the reaction with the formaldehyde a compound which will generate the bisulfite ion, $HSO_3^-$, such as $SO_2$, $Na_2S_2O_5$, and the like.

SUMMARY OF THE INVENTION

According to the invention, aqueous streams containing cyanide in a concentration of the order of up to about 1000 ppm are treated to reduce cyanide content by contacting said streams with formaldehyde and a compound which will generate the $HSO_3^-$ ion at a temperature from about 80° to about 135° C while maintaining the pH of the mixture in the range from 8–12 for a period of time sufficient to reduce the cyanide content to less than 1 ppm using a formaldehyde/$CN^-$ molar ratio of at least one and an $HSO_3^-/CN^-$ molar ratio from about 1.0 to about 1.5

DESCRIPTION OF THE PREFERRED EMBODIMENTS

Formaldehyde is generally added to the aqueous waste stream being treated as a 37% solution in water (commercial grade) but other forms may be used if desired.

The bisulfite ion, $HSO_3^-$, can be obtained by adding $SO_2$, sodium metabisulfite ($Na_2S_2O_5$), sodium bisulfite ($NaHSO_3$) or other alkali metal counterparts of these compounds such as potassium metabisulfite, lithium bisulfite and the like as well as ammonium bisulfite ($NH_4HSO_3$) to the aqueous stream being treated.

It is essential that the pH of the reaction mixture be maintained between 8 and 12 and preferably, for optimum results, between 9 and 10. This is done by adding the proper amount of a base such as an alkali metal or ammonium hydroxide, and in particular sodium hydroxide to the reaction system. The compound furnishing the $HSO_3^-$ ion is a source of acidity in the system and will cause a decrease in pH which must be corrected for by addition of base. The pH of the reactor contents should be monitored in or immediately downstream of the reactor and a means to control caustic addition based on this determination should be provided immediately ahead of the reactor.

The proportions of formaldehyde and $HSO_3^-$-producing compound employed are important variables. Cyanide concentration (total) of the aqueous waste stream being treated should be continuously monitored and the feed rates of formaldehyde and the $HSO_3^-$-producing compound should be adjusted based on actual cyanide analysis, to provide molar ratios of HCHO/$CN^-$ of at least one and preferably of about 1.5 and of $HSO_3^-/CN^-$ from about 1.0 to 1.5 and preferably about 1.2.

While the reaction temperature may vary from about 80° to about 135° C, preferred operation conditions include a temperature range from about 100° to about 120° C.

The reaction should be carried out under conditions which provide thorough mixing to achieve uniform composition and temperature. Preferably, a reactor equipped with means for mechanical agitation is employed.

Operation may be either on a batch or continuous basis. In batch operation, order of addition of the reactants is important. If the formaldehyde is added first and the reactor is then heated up to reaction temperature (60–70 min.), it may be lost to competing reactions and is not as effective. Thus, the formaldehyde should be added after the $HSO_3^-$-producing compound and the material being treated are brought to reaction temperature. In a continuous reaction system wherein the time between the addition of the various feed materials is short, the order of addition is not as critical. Reaction time or sojourn time in the reactor may vary depending upon practical considerations. Generally, the time is that sufficient to reduce the cyanide content to <1 ppm. Commercially feasible times for accomplishing this will usually be from about 0.2 to 1.0 hour. Preferred conditions include a reaction time from about 0.75 hour to 1.0 hour.

The invention is illustrated in the following examples which, however, are not to be construed as limiting it in any manner whatsoever.

EXAMPLE 1

A sample of paving run-off water containing about 20 ppm total cyanide was obtained from a commercial plant for the production of acrylonitrile by the catalytic reaction of propylene, oxygen and ammonia. Aliquots (about 800g) of this sample were treated for destruction of the cyanide contained therein as follows. Sodium metabisulfite ($Na_2S_2O_5$) was added, the pH of the resulting mixture was adjusted to about 9 by the addition of 25% sodium hydroxide, the mixture was charged to a 2.5-liter stainless steel reactor equipped with a mechanical stirrer and heated with stirring to reaction temperature. Additional cyanide in the form of 0.100g of potassium cyanide (KCN) in 5 ml of $H_2O$ was then added to the reactor followed by enough formaldehyde (37%) to provide a $HCHO/CN^-$ molar ratio of 2:1 while stirring was maintained and the reaction was allowed to proceed at reaction temperature over a period of about 1 hour with samples being collected every 6 minutes and analyzed for total cyanide ($CN^-$) content. Reaction conditions together with results obtained are presented in Table 1 below. A control sample to which no sodium metabisulfite was added but which otherwise was treated in the same manner is included for comparative purposes.

TABLE 1

| Run No. | $HSO_3^-/CN^-$ (Molar) | Temp °C | Final $CN^-$ (ppm) |
|---|---|---|---|
| 1 | 2.0 | 120 | 0.33 |
| 2 | 0. | 120 | 3.2 |
| 3 | 2.0 | 120 | 0.40 |
| 4 | 1.0 | 120 | 0.6 |
| 5 | 1.0 | 80 | 13 |
| 6 | 1.0 | 100 | 1.6 |
| 6a* | 1.0 | 100 | 0.6 |
| 7 | 0.5 | 120 | 1.1 |

*Reaction period 1.5 hour

EXAMPLE 2

Following the same procedure described in Example 1 except that sulfur dioxide ($SO_2$) was substituted for the $Na_2S_2O_5$ of that example, a series of aliquots of the same paving run-off water were treated at 120° C. The $SO_2$ was added gradually via a gas syringe. Conditions, amounts of reactants and results are presented in Table 2 below.

TABLE 2

| Run No. | pH | $HSO_3^-/CN^-$ (Molar) | $HCHO/CN^-$ (Molar) | Reaction Time, hr. | Final $CN^-$, ppm |
|---|---|---|---|---|---|
| 1 | 9.0 | 0.74 | 1.5 | 1.5 | 1.6 |
| 2 | 9.0 | 0.74 | 1.5 | 1.5 | 2.4 |
| 3 | 9.0 | 1.5 | 1.5 | 0.75 | 0.8 |
| 4 | 10 | 1.5 | 1.5 | 1.0 | 0.9 |
| 5 | 8 | 1.5 | 1.5 | 1.0 | 8.7 |
| 6 | 9 | 1.5 | 1.5 | 1.0 | 0.6* |

*Initial $CN^-$ concentration 100 + ppm

EXAMPLE 3

In this group of tests which paralleled those in Example 1, the formaldehyde reactant was added to the paving run-off water, the same waste material used in that example, prior to (Runs 1 and 2) and just after (Run 3) heating to reaction temperature and adding the KCN and sodium metabisulfite. Reaction temperature used throughout was 120° C, the $HCHO/CN^-$ molar ratio was 1.5, but the initial $CN^-$ concentration was varied by adding different amounts of crude acrylonitrile containing HCN or HCN per se and the $HSO_3^-/CN^-$ molar ratio varied somewhat. From the results given in Table 3, it will be seen that better results are obtained when the formaldehyde is introduced into the reaction last.

TABLE 3

| Run No. | pH | $HSO_3^-/CN^-$ (Molar) | Initial $CN^-$ (ppm) | Final $CN^-$ (ppm) | Reaction Time, hr. |
|---|---|---|---|---|---|
| 1 | 9 | 1.0 | 50+ | 1.1 | 1.5 |
| 2 | 9–7 | 1.5 | 550 | 6.0 | 1.0 |
| 3 | 9 | 1.5 | 200 | 0.5 | 1.0 |

EXAMPLE 4

The procedure described in Example 1 is repeated using several more samples of the same paving run-off used in the previous examples and another similar type sample with a cyanide content of 145 ppm from a different acrylonitrile plant. The cyanide content of all but one of the samples was fortified by addition of KCN or a dilute HCN solution to higher $CN^-$ concentrations. The $HCHO/CN^-$ molar ratio was maintained at 1.5 throughout, the pH at 9.0 and the temperature at 120° C. $Na_2S_2O_5$ was employed as catalyst. Results of these runs are tabulated below in Table 4.

TABLE 4

| Run No. | $HSO_3^-/CN^-$ | Initial $CN^-$, ppm | Final $CN^-$, ppm | Reaction Time, hr. |
|---|---|---|---|---|
| 1 | 1.5 | 200+ | 0.8 | 1.0 |
| 2 | 1.2 | 100+ | 0.3 | 0.75 |
| 3 | 1.2 | 100+ | 0.3 | 0.75 |
| 4 | 1.2 | 100+ | 0.5 | 0.4 |
| 5 | 1.2 | 145* | 0.8 | 0.2 |

*No $CN^-$ fortification

All analyses in the foregoing examples for total cyanide were made using a cyanide specific ion electrode (Orion Research Inc., Model 94-06 or equivalent) and a single junction reference electrode (Orion Research Inc., Model 90-01 or equivalent). A standard addition technique was used for convenience and also to obviate problems of matching sample and standard matrix compositions. Using a specific ion meter, a factor relating the added $CN^-$ to that contained in the sample can be read directly from the meter. No calibration curve is needed.

While the foregoing examples relate to cyanide-containing waste streams originating in an acrylonitrile plant, the invention is in no sense to be considered as restricted to treating just such streams. It will be obvious to those skilled in the art that any aqueous streams regardless of their source which are contaminated with cyanide can be detoxified by the method described and claimed herein.

What is claimed is:

1. The method of treating an aqueous stream containing cyanide wastes in a concentration of up to about 1000 ppm of said contaminant which comprises contacting said stream with formaldehyde and a compound which will generate $HSO_3^-$ at a temperature from about 80° to about 135° C while maintaining the pH of the reaction mixture in the range from about 8 to about 12 for a period of time sufficient to reduce the cyanide content to less than 1 ppm using a $HCHO/CN^-$ molar ratio of at least one and an $HSO_3^-/CN^-$ molar ratio from about 1.0 to about 1.5.

2. The process of claim 1 wherein said compound generating $HSO_3^-$ is chosen from the group consisting of sulfur dioxide, alkali metal metabisulfites, alkali metal bisulfites and ammonium bisulfite.

3. The method according to claim 1 wherein said compound generating $HSO_3^-$ is sulfur dioxide.

4. The process of claim 3 wherein said compound generating $HSO_3^-$ is sodium metabisulfite.

5. The process of claim 3 wherein said temperature is from about 100° to about 120° C.

6. The process of claim 4 wherein said temperature is from about 100° to about 120° C.

7. The process of claim 5 wherein said pH is maintained in the range from 9 to 10.

8. The process of claim 6 wherein the pH is maintained within the range of 9 to 10.

9. The process of claim 7 wherein said $HCHO/CN^-$ molar ratio is 1.5 and said $HSO_3^-/CN^-$ ratio is 1.2.

10. The process of claim 8 wherein said $HCHO/CN^-$ molar ratio is about 1.5 and said $HSO_3^-/CN^-$ ratio is 1.2.

* * * * *